US010104276B2

(12) United States Patent
Short et al.

(10) Patent No.: US 10,104,276 B2
(45) Date of Patent: Oct. 16, 2018

(54) PROJECTOR AS LIGHT SOURCE FOR AN IMAGE CAPTURING DEVICE

(71) Applicant: Hewlett-Packard Development Company, L.P., Houston, TX (US)

(72) Inventors: David Bradley Short, San Diego, CA (US); Robert L Mueller, San Diego, CA (US); Otto Sievert, Oceanside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/500,680

(22) PCT Filed: Jul. 31, 2014

(86) PCT No.: PCT/US2014/049302
§ 371 (c)(1),
(2) Date: Jan. 31, 2017

(87) PCT Pub. No.: WO2016/018415
PCT Pub. Date: Feb. 4, 2016

(65) Prior Publication Data
US 2017/0223244 A1  Aug. 3, 2017

(51) Int. Cl.
*H04N 5/225* (2006.01)
*H04N 5/232* (2006.01)
*F21V 14/06* (2006.01)
(52) U.S. Cl.
CPC .......... *H04N 5/2256* (2013.01); *F21V 14/06* (2013.01); *H04N 5/23216* (2013.01)

(58) Field of Classification Search
CPC ... H04N 5/2256; H04N 5/23216; F21V 14/06
See application file for complete search history.

(56) References Cited

U.S. PATENT DOCUMENTS

| 4,936,664 | A  | 6/1990  | Haraguchi et al. |
| 5,675,441 | A  | 10/1997 | Imanari          |
| 6,947,091 | B1 | 9/2005  | Widmann et al.   |
| 7,599,561 | B2 | 10/2009 | Wilson et al.    |
| 7,710,391 | B2 | 5/2010  | Bell et al.      |
| 8,121,640 | B2 | 2/2012  | Russ et al.      |

(Continued)

FOREIGN PATENT DOCUMENTS

| CN | 1543207 | 11/2004 |
| CN | 1843064 | 10/2006 |

(Continued)

OTHER PUBLICATIONS

Zhang, Li, and Shree Nayar. "Projection defocus analysis for scene capture and image display." ACM Transactions on Graphics (TOG). vol. 25. No. 3. ACM, 2006.*

(Continued)

*Primary Examiner* — Shahbaz Nazrul
(74) *Attorney, Agent, or Firm* — Patent Law Group LLP

(57) ABSTRACT

A projector includes a lens, an image capturing device, and a processor connected to the projector and the image capturing device. The processor includes instructions for illuminating a work space using the lens, defocusing the lens, and after defocusing the lens, capturing an image of the work space.

12 Claims, 1 Drawing Sheet

(56) References Cited

U.S. PATENT DOCUMENTS

| | | |
|---|---|---|
| 8,199,117 B2 | 6/2012 | Izadi et al. |
| 8,218,039 B2 | 7/2012 | Uchiyam |
| 8,505,822 B2 | 8/2013 | Wang et al. |
| 8,736,583 B2 | 5/2014 | Anderson et al. |
| 9,759,994 B1* | 9/2017 | Soyannwo ............. G03B 21/53 |
| 2002/0071672 A1 | 6/2002 | Omiya |
| 2004/0130685 A1 | 7/2004 | Wu |
| 2004/0227908 A1* | 11/2004 | Wada ..................... H04N 5/74 |
| | | 353/94 |
| 2005/0078092 A1 | 4/2005 | Clapper |
| 2006/0082740 A1 | 4/2006 | Radhouane |
| 2008/0018591 A1 | 1/2008 | Pittel et al. |
| 2008/0259289 A1* | 10/2008 | Nozaki ................. G03B 17/00 |
| | | 353/70 |
| 2009/0027570 A1 | 1/2009 | Fujinawa |
| 2009/0096994 A1* | 4/2009 | Smits ................. G02B 26/101 |
| | | 353/30 |
| 2009/0295908 A1 | 12/2009 | Gharib et al. |
| 2010/0188548 A1 | 7/2010 | Robinson et al. |
| 2011/0007161 A1 | 1/2011 | Batchko et al. |
| 2011/0176230 A1 | 7/2011 | Park |
| 2011/0242054 A1 | 10/2011 | Tsu |
| 2012/0121244 A1 | 5/2012 | Stavely |
| 2012/0320157 A1 | 12/2012 | Junuzovic et al. |
| 2013/0077236 A1 | 3/2013 | Becze et al. |
| 2014/0049816 A1 | 2/2014 | Nauli et al. |
| 2014/0064603 A1 | 3/2014 | Zhang et al. |
| 2016/0091781 A1* | 3/2016 | Magi .................... G03B 21/134 |
| | | 348/747 |

FOREIGN PATENT DOCUMENTS

| | | |
|---|---|---|
| CN | 101061427 | 10/2007 |
| EP | 1813982 | 8/2007 |
| GB | 982441 A | 2/1965 |
| JP | 2011-145583 A | 7/2011 |
| KR | 10-2011-0085269 A | 7/2011 |

OTHER PUBLICATIONS

EF-S 18-135mm F/3.5-5.6 IS STM, EF 40mml/2.8 STM, Technical Report, Aug. 2012, pp. 1-6, <canon.com/camera-museum/tech/report/2012/08/>.

Shahram Izadi et al., "C-Slate: A Multi-Touch and Object Recognition System for Remote Collaboration using Horizontal Surfaces,", 2007, pp. 3-10, IEEE.

Zhang, Li et al. "Projection Defocus Analysis for Scene Capture and Image Display." ACM Transactions on Graphics (TOG). vol. 25. No. 3. ACM, 2006.

* cited by examiner

PROJECTOR AS LIGHT SOURCE FOR AN IMAGE CAPTURING DEVICE

BACKGROUND

Computer systems may include an image capturing device such as a camera. The camera may be used, for example, to capture images of a work space near the computer, or to capture images of the computer user. In order for the camera to work optimally, the camera requires a light source to illuminate the area where images are captured by the camera.

BRIEF DESCRIPTION OF THE DRAWINGS

For a detailed description of venous examples, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection. As used herein, the phrase "user input device" refers to any suitable device for providing an input, by a user, into an electrical system such as, for example, a mouse, keyboard, a hand (or any finger thereof), a stylus, a pointing device, etc.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

In a device including both a digital projector and an image capturing device such as a camera, the projector may be used as a light source for the image capturing device.

One drawback of using a digital projector as a light source is the "screen-door effect," where the fine lines separating the projector's pixels become visible in the projected image. The projected image appears as if viewed through a screen.

As used herein, an "image" projected by the lens of a projector may be white light or light of any color which illuminates a work space. The light may illuminate real objects disposed in the work space, or virtual objects projected into the work space, for example by a device other than the projector, or otherwise present in the work space. Alternatively, the "image" projected by the lens may be content projected by the projector into the work space. "Illuminating" a work space may refer to either providing white light or light of any color in the work space, or projecting content in the work space.

Examples of the invention include methods and devices which may reduce or eliminate the screen door effect when a projector is used as a light source for an image capturing device.

Figure 1:
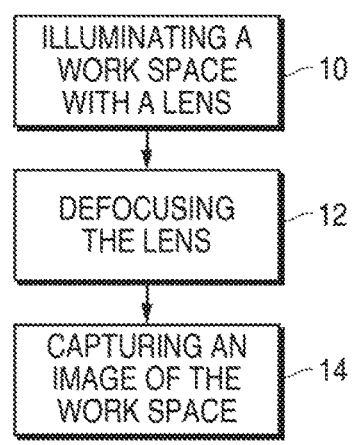
FIG. 1 is a flow chart illustrating a method according to examples the invention.

FIG. 1 illustrates a method according to examples of the invention. In stage 10, a work space is illuminated by a lens of a projector. The projector may be any suitable device including, for example, a digital projector, a digital light processing (DLP) projector, or a digital projector employing a digital micro-mirror device.

In stage 12, the lens of the projector is defocused, or adjusted such that the projected image is slightly out of focus. In some examples, the lens is defocused enough that lines separating the projector's pixels become blurred, which may reduce or eliminate the screen-door effect in a captured image of the projected image or of the work space as illuminated by the projector.

In stage 14, after defocusing the lens, an image of the work space is captured by an image capturing device such as a camera.

Figure 2:
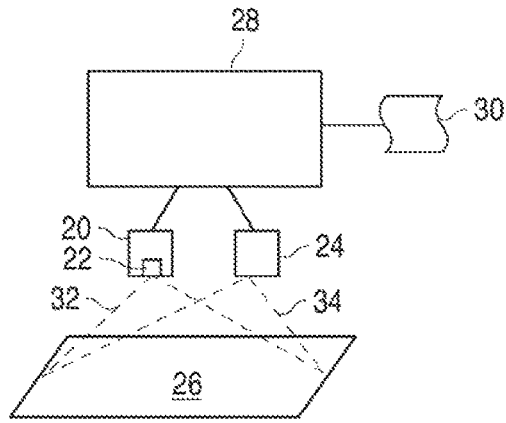
FIG. 2 is a block diagram of system according to examples of the invention.

FIG. 2 illustrates a system according to examples of the invention. The system illustrated in FIG. 2 includes a projector 20, an image capturing device 24, and a processor 28.

The projector 20 may be any suitable device, as described above in reference to FIG. 1. Examples of suitable projectors 20 include but are not limited to, for example, a digital projector, a digital light processing (DLP) projector, and a digital projector employing a digital micro-mirror device. The projector 20 includes a lens 22. The lens may project an image onto a work space 26.

The work space 26 may be delineated by visual or actual borders, though this is not required. For example, the work space 26 may be empty space, a pad with no functionality, or a touch-sensitive or other pad that may be used as a user-input device. The work space 26 is often substantially horizontal, for example a table top surface or desk top surface, though this is not required.

The image capturing device 24 may be, for example, a still camera, a video camera, or any other suitable device capable of capturing images of the work space 26.

The processor 28 includes a central processing unit, volatile memory, nonvolatile memory, and any other suitable components. The processor 28 is often incorporated into a computer. As used herein, the term "computer" refers broadly to any device that a user controls or interacts with using an input device. A computer is often a general purpose computer that can execute a wide variety of applications under the control of a user. Examples of suitable computers include desktop computers, laptop computers, other personal computers, smartphones, tablets, all-in-one computers (i.e., a display that also houses the computer's board), or some combination thereof.

Non-transitory machine readable instructions 30 are coupled to processor 28. Non-transitory machine readable instructions 30 are a set of computer-readable instructions installed on a computer-readable medium such as, for example, a hard drive of a computer, and executed by the processor 28 of a computer.

The processor 28 is coupled to the projector 20 and the image capturing device 24. The machine readable instructions 30 include instructions for instructing the projector 20 to illuminate the work space 26 using the lens 22, as indicated by lines 32; instructing the projector to defocus the lens 22; and after defocusing the lens, instructing the image capturing device 24 to capture an image of the work space, as indicated by lines 34.

Figure 3:
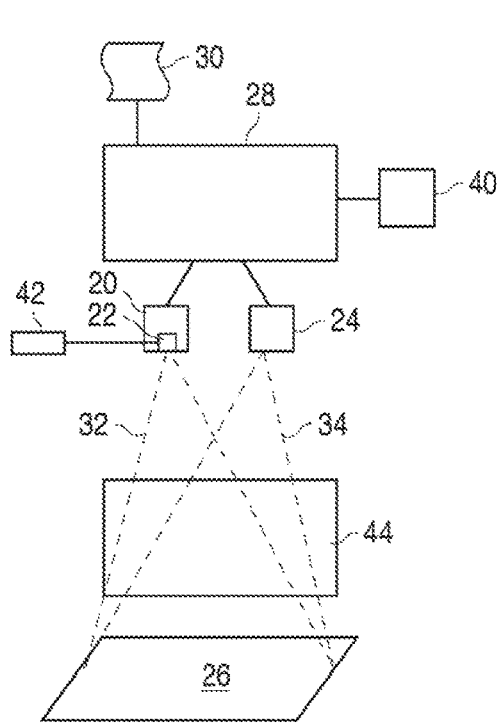
FIG. 3 is a block diagram of system according td examples of the invention.

FIG. 3 illustrates a system according to examples of the invention. As in FIG. 2, the system illustrated in FIG. 3 includes a projector 20, an image capturing device 24, and a processor 28. In addition, a motor 42 is coupled to the lens 22 of projector 20. A user input device 40 is coupled to the processor 28. A display device 44 is coupled to the processor 28. The display device 44 is often substantially perpendicular to or angled relative to the work space 26, though this is not required.

In some examples, the non-transitory machine readable instructions 30 include instructions for receiving a signal that the image capturing device 24 is about to capture an image. The signal that the image capturing device is about to capture an image may be, for example, a user generated signal, for example from user input device 40 or the signal that the image capturing device is about to capture an image may be an automatically generated signal. For example, the system may capture an image of the work space according to a predetermined schedule (for example, every minute) while the system is in use, as a backup or for any other purpose.

In some examples, the non-transitory machine readable instructions 30 may further include instructions for sending a signal to the motor 42 coupled to the lens 22 of projector 20, in response to the user-generated or automatically-generated signal that the image capturing device 24 is about to capture an image. The signal sent to the motor 42 instructs the motor 42 to rotate the lens 22 to defocus the lens.

In some examples, the non-transitory machine readable instructions 30 may further include instructions to refocus the lens 22 after capturing the image. Instructions to refocus the lens may include instructions for sending a signal to the motor coupled to the lens, the signal instructing the motor to rotate the lens 22. The signal may be a signal to return the lens to the position of the lens prior to the defocusing, or any other suitable signal which refocuses the lens.

In some examples, the non-transitory machine readable instructions 30 may further include instructions to display the captured image, for example on display device 44 or on any other suitable display.

Figure 4:
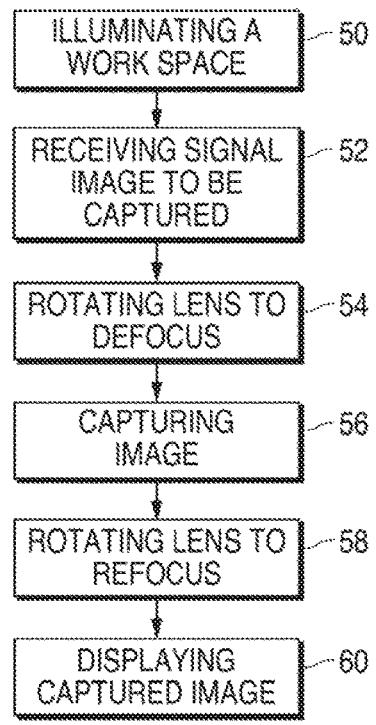
FIG. 4 is a flow chart illustrating a method according to examples of the invention.

FIG. 4 illustrates a method according to examples of the invention. In stage 50, a work space is illuminated, for example by a lens of a projector.

In stage 52, a signal that an image capturing device is about to capture an image is received by, for example, a processor of a computer. The signal that the image capturing device is about to capture an image may be, for example, a user generated signal from any suitable user input device, or an automatically generated signal.

In stage 54, the lens of the projector is rotated to defocus the image or light projected by the projector. In some examples, the lens is defocused enough that lines separating the projector's pixels become blurred, which may reduce or eliminate the screen-door effect in a captured image of the projected image or in a captured image of the illuminated work space. The lens may be rotated by, for example, a motor coupled to the lens. The motor may rotate the lens, for example, upon receiving a signal to do so from a processor of a computer.

In stage 56, after defocusing the lens, an image of the work space is captured by an image capturing device such as a camera.

In stage 58, the lens of the projector is rotated to refocus the image or light projected by the projector, after capturing the image in stage 56. The lens may be rotated by, for example, a motor coupled to the lens. The motor may rotate the lens, for example, upon receiving a signal to do so from a processor of a computer. In stage 58, the lens may be returned to its position prior to rotating the lens to defocus, illustrated in stage 54.

In stage 60, the image captured in stage 56 may be displayed, for example on any suitable display device.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   illuminating a work space using a lens of a projector;
   defocusing the lens;
   after defocusing the lens, capturing an image of the work space; and
   after capturing the image, refocusing the lens.

2. The method of claim 1 wherein defocusing the lens comprises:
   receiving, using a processor, a first signal that an image capturing device is about to capture an image;
   sending, using the processor, a second signal to a motor coupled to the lens, the second signal instructing the motor to rotate the lens.

3. The method of claim 1 wherein refocusing the lens comprises:
   sending, using a processor, a signal to a motor coupled to the lens, the signal instructing the motor to rotate the lens.

4. The method of claim 3 wherein the signal comprises a signal to return the lens to the position of the lens during said illuminating a work space using a lens of a projector.

5. The method of claim 1 further comprising, receiving, using a processor, a signal from a user input device to capture an image of the work space.

6. The method of claim 1 further comprising displaying the captured image.

7. A device comprising:
   a projector comprising a lens;
   an image capturing device;
   a display; and
   a processor coupled to the projector, the image capturing device, and the display, the processor comprising instructions for:
   illuminating a work space using the lens;
   defocusing the lens;
   after defocusing the lens, capturing an image of the work space; and
   displaying the captured image on the display; and
   refocusing the lens after capturing the image.

8. The device of claim 7 further comprising a motor coupled to the lens, wherein the processor further comprises instructions for:
- receiving a first signal that the image capturing device is about to capture an image;
- sending a second signal to the motor instructing the motor to rotate the lens.

9. The device of claim 7 further comprising a user input device, wherein the processor further comprises instructions for receiving a signal from the user input device to capture an image of the work space.

10. A non-transitory computer readable medium encoded with instructions executable by a processor to:
- illuminate a work space using a lens;
- rotate the lens to defocus the lens;
- after rotating the lens, capture an image of the work space with a camera; and
- after capturing an image of the work space with a camera, rotate the lens to refocus the lens.

11. The non-transitory computer readable medium of claim 10, wherein the instructions are further executable by the processor to:
- receive a signal that the camera is about to capture an image;
- rotate the lens using a motor coupled to the lens.

12. The non-transitory computer readable medium of claim 10, wherein the instructions are further executable by the processor to:
- display the captured image with a display device.

* * * * *